US008509145B1

(12) United States Patent  
Oroskar et al.

(10) Patent No.: US 8,509,145 B1  
(45) Date of Patent: Aug. 13, 2013

(54) METHOD AND SYSTEM FOR USING MULTIPLE PSEUDONOISE (PN) INCREMENTS

(75) Inventors: Siddharth S. Oroskar, Overland Park, KS (US); Manoj Shetty, Overland Park, KS (US); Sachin R. Vargantwar, Overland Park, KS (US); Anoop Goyal, Overland Park, KS (US); Kamal Doshi, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1176 days.

(21) Appl. No.: 11/961,664

(22) Filed: Dec. 20, 2007

(51) Int. Cl.  
*H04W 4/00* (2009.01)  
*H04W 36/00* (2009.01)  
*H04B 7/216* (2006.01)

(52) U.S. Cl.  
USPC ........... 370/328; 370/331; 370/335; 455/434; 455/436

(58) Field of Classification Search  
USPC ............ 370/331, 328, 310.2; 455/436, 562.1  
See application file for complete search history.

(56) References Cited

U.S. PATENT DOCUMENTS

| | | | |
|---|---|---|---|
| 6,049,564 A | 4/2000 | Chang | |
| 6,058,136 A | 5/2000 | Ganesh et al. | |
| 6,272,122 B1 | 8/2001 | Wee | |
| 6,310,871 B1 | 10/2001 | Kim | |
| 6,597,677 B1 | 7/2003 | Segawa | |
| 6,618,432 B1 | 9/2003 | Ganesh | |
| 6,775,252 B1 * | 8/2004 | Bayley | 370/328 |
| 6,813,478 B2 | 11/2004 | Glazko et al. | |
| 6,922,435 B2 | 7/2005 | Neufeld et al. | |
| 7,139,580 B2 | 11/2006 | Stein et al. | |
| 2002/0071403 A1 * | 6/2002 | Crowe et al. | 370/331 |
| 2003/0007468 A1 * | 1/2003 | Joshi et al. | 370/335 |
| 2004/0092291 A1 * | 5/2004 | Legnain et al. | 455/562.1 |
| 2007/0191005 A1 * | 8/2007 | Cooper et al. | 455/434 |
| 2008/0160998 A1 * | 7/2008 | Jovanovic | 455/436 |

* cited by examiner

*Primary Examiner* — Ian N Moore  
*Assistant Examiner* — Kiet Tang

(57) ABSTRACT

A first serving system controls a first group of sectors that transmit pilot signals having pseudonoise (PN) offsets corresponding to a first PN increment, and a second serving system controls a second group of sectors that transmit pilot signals having PN offsets corresponding to a second PN increment. The first serving system serves a mobile station via a sector in the first group and determines that the mobile station is likely to be in a communication range of at least one sector in the second group. In response, the first serving system instructs the mobile station to use the second PN increment when scanning for pilot signals. Thereafter, the mobile station may use the first PN increment to scan for pilot signals to add to its remaining set and, if the remaining set is not large enough, may then use the second PN increment to scan for additional pilot signals.

16 Claims, 4 Drawing Sheets

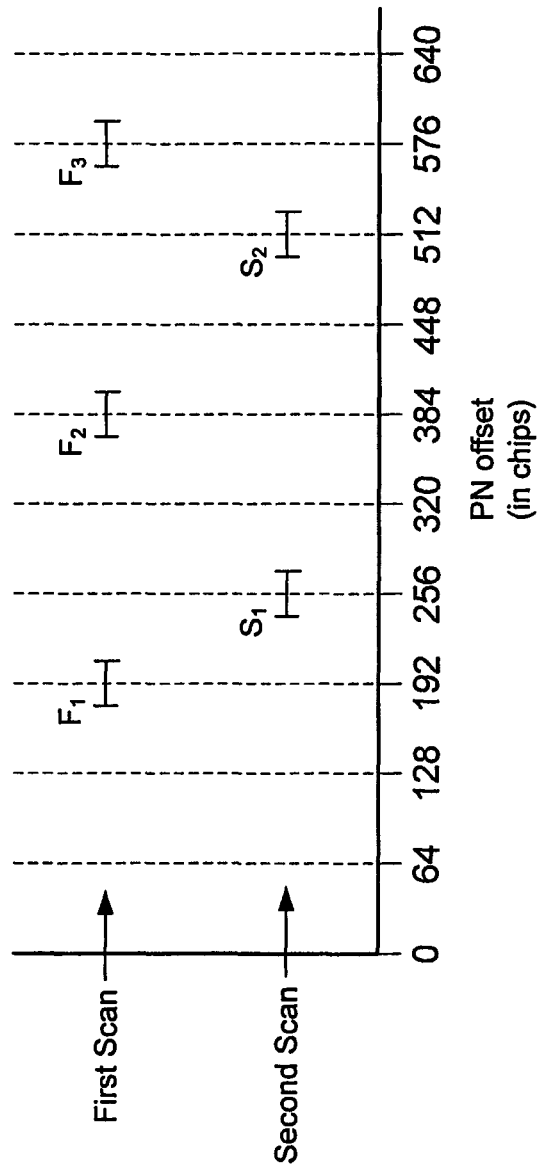

METHOD AND SYSTEM FOR USING MULTIPLE PSEUDONOISE (PN) INCREMENTS

BACKGROUND

Spread spectrum communications are commonly used in cellular networks that provide wireless service to mobile stations, such as wireless telephones. Such cellular networks typically operate in accordance with IS-95 CDMA or cdma2000 standards.

The signals transmitted by base stations in a spread spectrum communication system are spread by a pseudonoise (PN) code. For example, in accordance with IS-95 CDMA standards, the pilot signal transmitted by a base station is spread by a "short" PN code that has a register length of 15 and a chipping rate of 1.2288 MHz. Each pilot signal may be spread by the same "short" PN code but with a different phase or "PN offset." Thus, different pilot signals may be distinguished by their PN offsets. In accordance with IS-95 CDMA standards, each PN offset is defined by an index that is an integer in the range of 0 through 511. The actual PN offset is then found by multiplying its index by 64 chips.

A mobile station may find base stations, or sectors of base stations, by detecting their pilot signals. The mobile station may then keep track of the pilot signals that it has detected by maintaining "pilot sets" that identify sectors by the PN offsets of their pilot signals. For example, a mobile station may maintain an "active set" that identifies the PN offsets of the sectors with which the mobile station is currently communicating, a "neighbor set" that identifies the PN offsets of neighboring sectors, a "candidate set" that identifies the PN offsets of sectors that are candidates for inclusion in the active set, and a "remaining set" that identifies all other PN offsets that the mobile station has detected.

The mobile station may continually monitor the signal strengths of the pilot signals it has detected in order to adjust the placement of the pilot signals in these sets. For example, when the signal strength of a pilot signal in the "neighbor set" or "remaining set" exceeds a threshold value, the mobile station may add the pilot signal to its "candidate set" and report its signal strength to the network by transmitting a Pilot Strength Measurement Message (PSMM). The network may subsequently instruct the mobile station to effect a handoff by moving the sector from the candidate set to the active set. Thus, the neighbor set and remaining set identify sectors that may be available for a handoff at some later time.

A mobile station may populate its neighbor set based on neighbor list messages that are broadcast by the mobile station's serving sector. However, a mobile station typically populates its remaining set by scanning for pilot signals. Moreover, a mobile station typically scans for pilot signals by using a PN increment that defines which of the 512 possible PN offset indices are actually used in the cellular network. For example, a PN increment of N would indicate that only the PN offset indices that are multiples of N are used. Thus, when scanning for pilot signals, the mobile station would only need to look for PN offsets with indices N, 2N, 3N, etc.

OVERVIEW

In a first principal aspect, an exemplary embodiment provides a method for a spread spectrum communication system comprising a first group of sectors and a second group of sectors. Sectors in the first group transmit pilot signals having pseudonoise (PN) offsets corresponding to a first PN increment. Sectors in the second group transmit pilot signals having PN offsets corresponding to a second PN increment. In accordance with the method, a mobile station is served via a sector in the first group. The mobile station is instructed via the sector to use the second PN increment when scanning for pilot signals.

In a second principal aspect, an exemplary embodiment provides a method for spread spectrum communication. A first serving system controls a first group of sectors, and a second serving system controls a second group of sectors. Sectors in the first group transmit pilot signals having pseudonoise (PN) offsets corresponding to a first PN increment. Sectors in the second group transmit pilot signals having pseudonoise (PN) offsets corresponding to a second PN increment. In accordance with the method, while the first serving system serves a mobile station via a sector in the first group, the first serving system determines that the mobile station is likely to be in a communication range of at least one sector in the second group. The first serving system responsively instructs the mobile station to use the second PN increment when scanning for pilot signals.

In a third principal aspect, an exemplary embodiment provides a spread spectrum communication system comprising a first serving system for controlling a first group of sectors and a second serving system for controlling a second group of sectors. Sectors in the first group transmit pilot signals having pseudonoise (PN) offsets corresponding to a first PN increment. Sectors in the second group transmit pilot signals having PN offsets corresponding to a second PN increment. The first serving system is configured to instruct mobile stations to use the second PN increment when scanning for pilot signals.

BRIEF DESCRIPTION OF THE DRAWINGS

FIG. 4 is a chart illustrating a first scan for PN offsets corresponding to a first PN increment and a second scan for PN offsets corresponding to a second PN increment.

DETAILED DESCRIPTION OF EXEMPLARY EMBODIMENTS

1. Introduction

Figure 1:
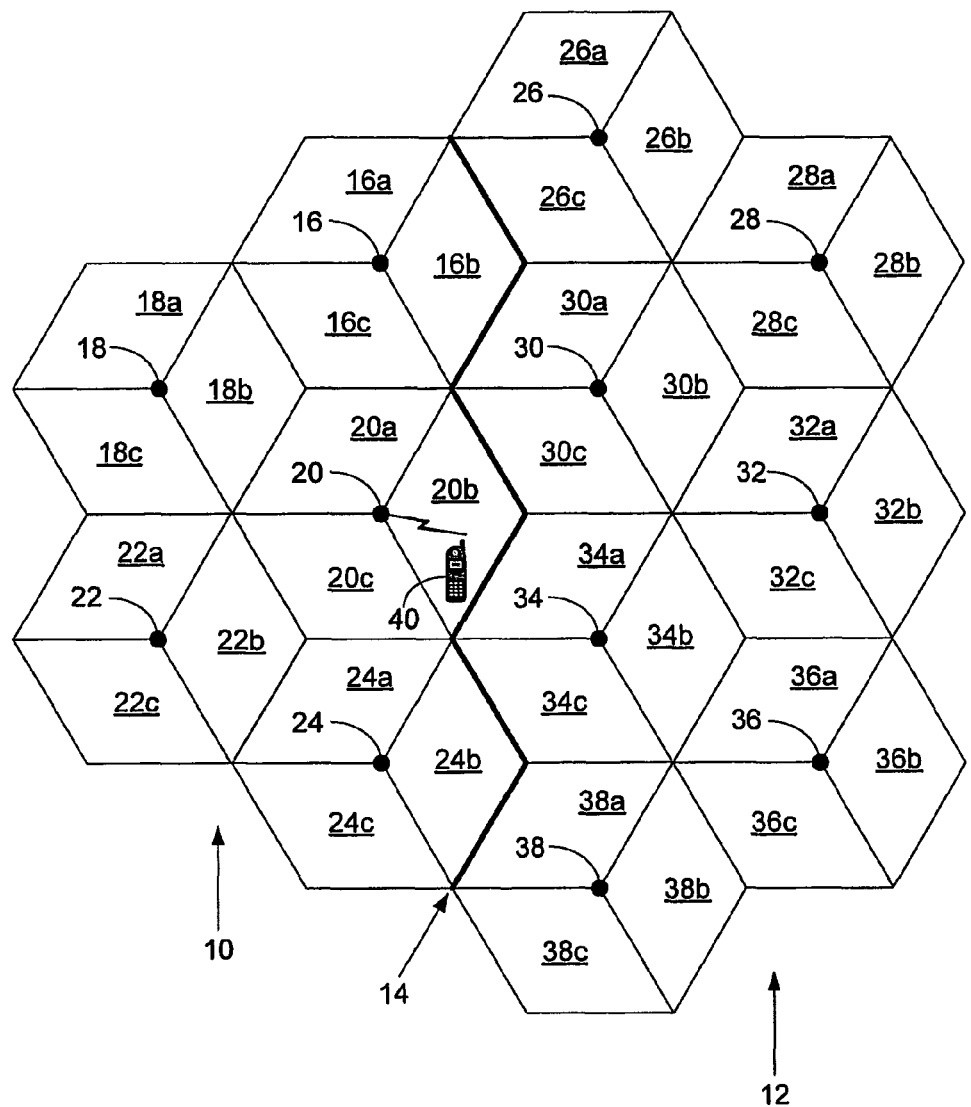
FIG. 1 is a schematic diagram illustrating an arrangement of sectors comprising a first group of sectors that use a first PN increment and a second group of sectors that use a second PN increment, in accordance with an exemplary embodiment.

The inventors have recognized that difficulties can arise when different PN increments are used in different areas. For example, a first group of sectors, providing wireless coverage in a first area, might transmit pilot signals with PN offsets that correspond to a first PN increment, whereas a second group of sectors, providing wireless coverage in a neighboring second area, might transmit pilot signals with PN offsets that correspond to a second, different PN increment.

Different PN increments may be used in different areas for various reasons. For example, the first and second groups of sectors might be operated by different wireless service providers. Alternatively, the first and second groups of sectors might be operated by the same wireless service provider but they may be located in different environments (e.g., one group of sectors may be in an urban environment and the other group of sectors may be in a rural environment) or they may have been deployed at different times.

The different PN increments can cause problems when a mobile station roams from the first area to the second area. In particular, when operating in the first area, the mobile station may use the first PN increment to scan for pilot signals and thereby locate acceptable pilot signals from one or more sectors in the first group. When the mobile station moves into the second area, the mobile station may continue using the first PN increment to scan for pilot signals. However, because the sectors in the second area use the second PN increment, the mobile station's scanning might not find any acceptable pilot signals from the second group of sectors. As a result, a mobile station may be more likely to drop an ongoing call when the mobile station moves from a first area that uses a first PN increment to a second area that uses a second, different PN increment.

To address this problem, the inventors propose instructing a mobile station that is being served by a sector that uses a first PN increment to use a second PN increment when scanning for pilot signals. That way, the mobile station may find pilot signals transmitted by sectors that use the second PN increment and, as a result, be in a better position to maintain a call if the mobile station moves into an area covered by sectors that use the second PN increment.

In an exemplary embodiment, the mobile station is instructed to use the second PN increment in response to a determination that the mobile station is likely to be in a communication range of at least one sector that uses the second PN increment. This determination could be made, for example, based on RF conditions. For example, if the mobile station is engaged in a call via a sector that uses the first PN increment, and there are no other pilots in the mobile station's active set, then a degradation in signal quality on the forward link and/or the reverse link may indicate that the mobile station is moving out of communication range of sectors that use the first PN increment and into communication range of one or more sectors that use the second PN increment. Alternatively, the signal strengths of pilot signals measured by the mobile station may be analyzed. If the signal strengths fall below a predetermined value, then it may be determined that the mobile station is moving out of communication range of sectors that use the first PN increment and into communication range of one or more sectors that use the second PN increment.

The determination could also be made based on information regarding the mobile station's location. For example, the mobile station may be instructed to use the second PN offset when scanning for pilot signals in response to a determination that the mobile station is being served by a boundary sector, i.e., a sector adjacent to a boundary between the first group of sectors and the second group of sectors. Such a determination could be made, for example, when the mobile station adds the boundary sector to its active set. Similarly, the mobile station may be instructed to use the second PN increment when scanning for pilot signals whenever the mobile station is given a neighbor list that identifies at least one PN offset corresponding to the second PN increment.

It is to be understood, however, that after being instructed to use the second PN increment when scanning for pilot signals, the mobile station might continue using the first PN increment. For example, the mobile station might use the first PN increment as a "primary" PN increment and use the second PN increment as a "secondary" PN increment. Thus, when scanning for pilot signals to add to its remaining set, the mobile station may conduct a first scan using the first PN increment. The mobile station would then conduct a second scan using the second PN increment only if the first scan is deemed to be inadequate, e.g., if an insufficient number of acceptable pilot signals were found in the first scan.

In some cases, the mobile station may be instructed to use the first PN increment as the "primary" PN increment and to use the second PN increment as the "secondary" PN increment throughout the first area. In that case, it may be unnecessary to determine when the mobile station is likely to be in a communication range of at least one sector that uses the second PN increment. Instead, the mobile station would simply start scanning for pilot signals using the second PN increment when the number of acceptable pilot signals found using the first PN increment falls below a certain value—a situation that may occur when the mobile station moves from the first area to the second area.

By scanning for pilot signals with PN offsets corresponding to the second PN increment used by the second group of sectors while the mobile station is still being served by one or more sectors in the first group of sectors, the mobile station may beneficially identify second group sectors before a handoff to a second group sector is actually needed. That way, the mobile station is less likely to drop an ongoing call when moving from the wireless coverage area provided by the first group of sectors to the wireless coverage area provided by the second group of sectors.

2. Exemplary Spread Spectrum Communication System

FIG. 1 illustrates, in schematic form, an arrangement of sectors in an exemplary spread spectrum communication system. The sectors include a first group of sectors 10 and a second group of sectors 12. Also shown in FIG. 1 is a boundary 14 (shown as a heavy line) between first group 10 and second group 12.

In an exemplary embodiment, each of the sectors is defined by respective directional antennas on a respective base transceiver station (BTS). Thus, FIG. 1 shows BTSs 16, 18, 20, 22, and 24 defining sectors 16a-c, 18a-c, 20a-c, 22a-c, and 24a-c, respectively, in first group 10, and FIG. 1 shows BTSs 26, 28, 30, 32, 34, 36, and 38 defining sectors 26a-c, 28a-c, 30a-c, 32a-c, 34a-c, 36a-c, and 38a-c, respectively, in second group 12.

It is to be understood that the arrangement of sectors illustrated in FIG. 1 is exemplary only. Thus, each BTS may define a greater or fewer number of sectors, and groups 10 and 12 may include a greater or fewer number of sectors. In addition, as a schematic diagram, FIG. 1 is intended to illustrate the relative locations of exemplary sectors, rather than the actual sizes and shapes of sectors.

Each sector may support spread spectrum communications between its respective BTS and one or more mobile stations. For example, FIG. 1 shows a mobile station 40 in communication with sector 20b of BTS 20. Mobile station 40 could be, for example, a wireless telephone, wireless personal digital assistant (PDA), wirelessly equipped laptop computer, or other wireless communication device. The communications between mobile station 40 and sector 20b may conform to a standard such as IS-95 CDMA, cdma2000, or other spread spectrum communication standard.

Each of the sectors in first group 10 and in second group 12 transmits a pilot signal with a respective PN offset. More particularly, the sectors in first group 10 transmit pilot signals that have PN offsets corresponding to a first PN increment and the sectors in second group 12 transmit pilot signals that have PN offsets correspond to a second PN increment. Each PN increment defines the number of chips between successive PN offsets. In an exemplary embodiment, the PN increment is given as an integer that represents a multiplier on a base number of chips.

The base number of chips could be, for example, 64 chips. In that case, a PN increment of "2" would indicate 128 chips between successive PN offsets, a PN increment of "3" would indicate 192 chips between successive PN offsets, a PN increment of "4" would indicate 256 chips between successive PN offsets, etc. Thus, first group 10 might use a PN increment of "3," meaning that the sectors in first group 10 transmit pilot signals with PN offsets corresponding to integral multiples of 192 chips. However, second group 12 might use a PN increment of "4," meaning that the sectors in second group 12 transmit pilot signals with PN offsets corresponding to integral multiples of 256 chips.

Figure 2:
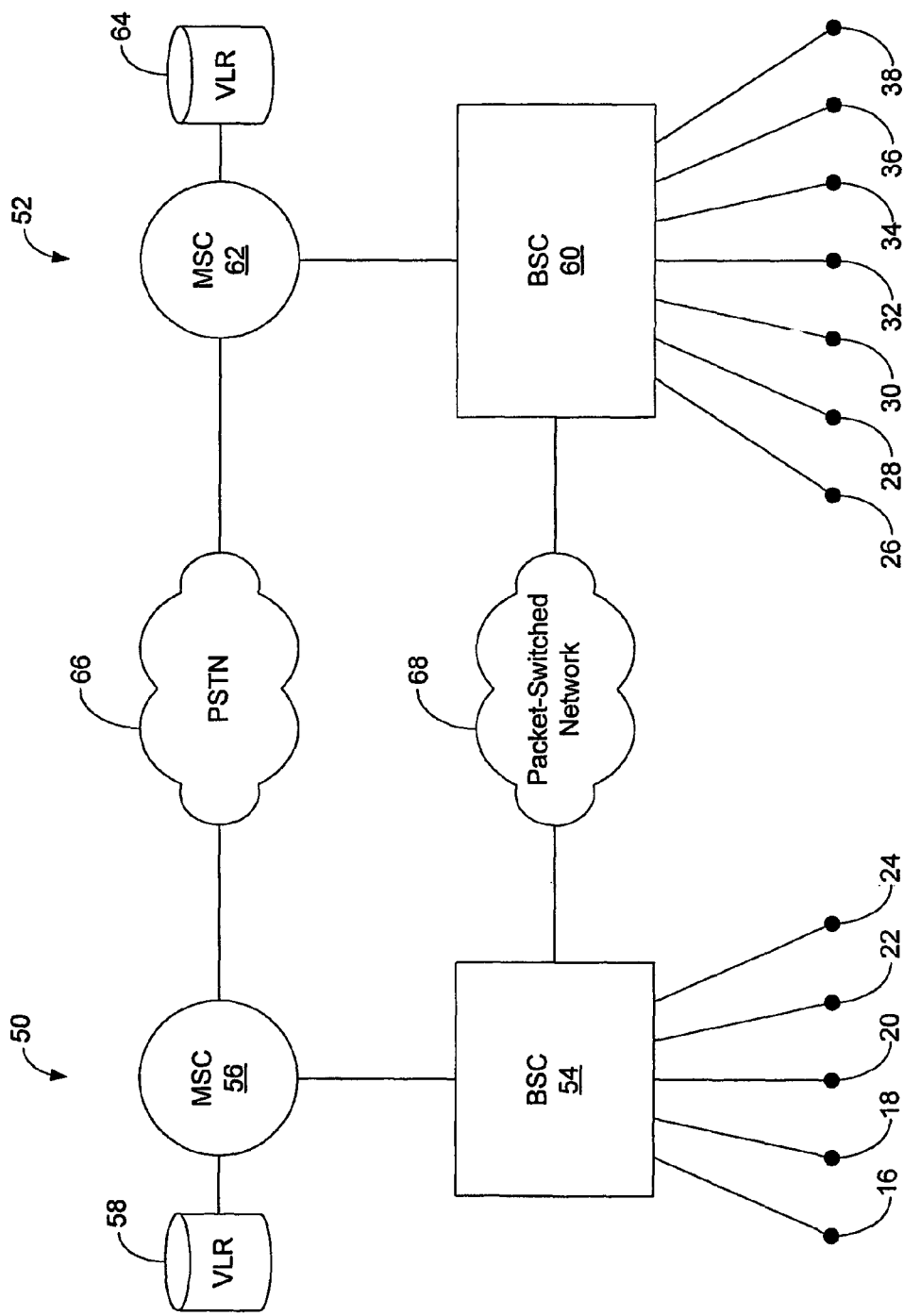
FIG. 2 is a block diagram of a spread spectrum communication system, in accordance with an exemplary embodiment.

First group 10 and second group 12 may be controlled by different serving systems. For example, FIG. 2 shows a first serving system 50 controlling BTSs 16-24 (i.e., the BTSs that define the sectors in first group 10) and shows a second serving system 52 controlling BTSs 26-38 (i.e., the BTSs that define the sectors in second group 12). Serving systems 50 and 52 might be operated by different wireless service providers, or they might be operated by the same wireless service provider.

First serving system 50 may include a base station controller (BSC) 54, a mobile switching center (MSC) 56, and a visitor location register (VLR) 58. Similarly, second serving system 52 may include a BSC 60, an MSC 62, and a VLR 64. MSCs 56 and 62 may connect calls through circuit-switched connections, for example, through the public switched telephone network (PSTN) 66.

Serving systems 50 and 52 may also support communications through other types of networks, such as packet-switched network 68. In this regard, BSCs 54 and 60 may be communicatively coupled to packet-switched network 68 via respective packet control functions (PCFs), packet data serving nodes (PDSNs), and/or other elements not shown in FIG. 2.

VLRs 58 and 64 may keep track of mobile stations that are being served by their respective serving system. For example, a mobile station may register with VLR 58 in order to be served by serving system 50. The mobile station may then move into an area served by serving system 52, in which case the mobile station may register with VLR 64 in order to be served by serving system 52. For example, mobile station 40 shown in FIG. 1 may move from sector 20b in first group 10 to sector 30c in second group 12. If mobile station 40 is engaged in a call, an inter-system or "hard" handoff may be used to transfer the call from sector 20b to sector 30c.

As described in more detail below, first serving system 50 may be configured to determine when a mobile station that it is serving is likely to be in a communication range of at least one sector in second group 12. Similarly, second serving system 52 may be configured to determine when a mobile station that it is serving is likely to be in a communication range of at least one sector in first group 10. Although FIG. 1 shows first serving system 50 and second serving system 52 as each having one MSC, one BSC, and one VLR, either of the serving systems could have more than one MSC, BSC, and/or VLR.

3. Exemplary Method

Figure 3:
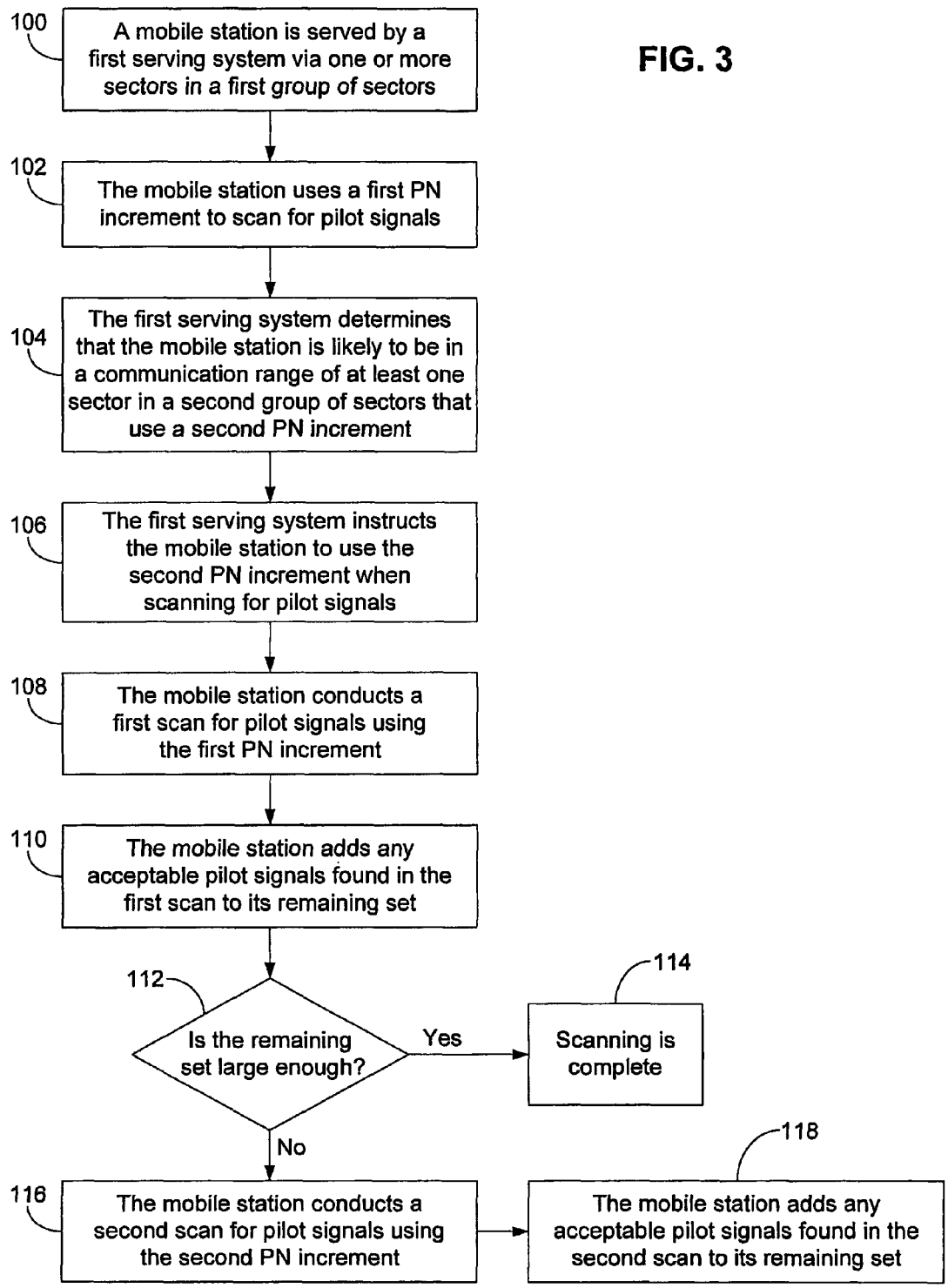
FIG. 3 is a flow chart illustrating a method of using first and second PN increments, in accordance with an exemplary embodiment.

FIG. 3 is a flow chart illustrating an exemplary method for using first and second PN increments. The process may begin when a mobile station is served by a first serving system via one or more sectors in a first group of sectors, as indicated by block 100. For example, with reference to FIGS. 1 and 2, mobile station 40 may be served by first serving system 50 via sector 20b in first group 10. The pilot signals transmitted by the sectors in the first group of sectors have PN offsets corresponding to a first PN increment. Thus, the mobile station uses the first PN increment to scan for pilot signals, as indicated by block 102.

At some point, the first serving system determines that the mobile station is likely to be in a communication range of at least one sector in a second group of sectors that use a second PN increment (e.g., in a communication range of at least one sector in second group 12), as indicated by block 104. For example, a mobile station may be in a communication range of a second group sector when a handoff to that second group sector could be effected without dropping an ongoing call.

Different approaches could be used to make this determination. In one approach, the mobile station may be deemed likely to be in a communication range of at least one sector in the second group whenever the first serving system serves the mobile station via a boundary sector (i.e., a sector adjacent to a boundary between the first group of sectors and the second group of sectors). For example, in the configuration illustrated in FIG. 1, sectors 16b, 20b, and 24b may be defined as the "boundary sectors." In that case, movement by a mobile station, such as mobile station 40, from sector 20c to 20b might trigger a determination that the mobile station is likely to be in a communication range of at least one sector in the second group.

It is to be understood, however, that the "boundary sectors" could be defined differently than in the example described above. For example, in the configuration illustrated in FIG. 1, all of the sectors defined by BTSs 16, 20, and 24 (i.e., sectors 16a-c, 20a-c, and 24a-c) might be defined as boundary sectors. In yet another approach, a sector may be considered a "boundary sector" if the sector broadcasts a neighbor list that identifies one or more sectors in the second group of sectors (i.e., identifies at least one PN offset corresponding to the second PN increment). For example, sector 20b may broadcast a neighbor list that identifies sectors 30c and 34a in second group 12, thereby indicating that sector 20b is a boundary sector. If sector 20c also broadcasts a neighbor list that identifies one or more sectors in second group 12 (e.g., sector 34a), then sector 20c may also be considered a boundary sector.

In another approach, the determination that the mobile is likely to be in a communication range of the second group of sectors may be based on RF conditions. For example, if the mobile station is involved in a call, the determination may be made in response to detecting a signal degradation in either the forward link or the reverse link used for the call. A signal degradation could be detected, for example, when an error rate for the signal exceeds a threshold value. The signal degradation may indicate that the mobile station is moving out of the wireless coverage area provided by the first group of sectors and into the wireless coverage area provided by the second group of sectors and, thus, a handoff to a sector in the second group may be beneficial.

However, the first serving system may also take into account whether a handoff to another sector in the first group would be available. For example, if the mobile station's active set includes two or more sectors in the first group of sectors, then a signal degradation for only one of the sectors in the active set might not trigger a determination that the mobile station is likely to be in a communication range of at least one sector in the second group. This is because the other sectors in the mobile station's active set may still have an adequate signal quality, thereby indicating that the mobile station is still well within the wireless coverage area provided by the first group of sectors. In addition to the sectors in the mobile station's active set, the first serving system may also analyze the signal strengths of other pilot signals reported by the mobile station.

If the mobile station is not engaged in a call, the first serving system may simply analyze the pilot signal strengths that the mobile station most recently reported, e.g., in a Pilot Strength Measurement Message (PSMM). For example, if some or all of the reported signal strengths are below a predetermined level, the first serving system may determine that the mobile station is moving out of the wireless coverage area provided by the first group of sectors and into the wireless coverage area provided by the second group of sectors.

It is to be understood, however, that these approaches for determining when the mobile station is likely to be in a communication range of at least one sector in the second group are exemplary only, as other approaches could be used. In addition, the first serving system may take into account multiple sources of information before determining that the mobile station is likely to be in a communication range of at least one sector in the second group. For example, the first serving system may consider whether a mobile station is being served by a boundary sector in addition to the RF conditions in order to determine whether the mobile station is likely to be in a communication range of at least one sector in the second group of sectors.

In response to determining that the mobile station is likely to be in a communication range of at least one sector in the second group, the first serving system instructs the mobile station to use the second PN increment (i.e., the PN increment used by the sectors in the second group) when scanning for pilot signals, as indicated by block 106. The instruction could be a broadcast message. For example, the instruction could be included in a neighbor list message that is broadcast by a sector. Alternatively, the instruction could be a message directed to a specific mobile station. In either case, the instruction may be transmitted via one or more sectors currently serving the mobile station, i.e., via one or more sectors in the first group of sectors. For example, in the configuration illustrated in FIG. 1, mobile station 40 may receive the instruction via sector 20b.

After receiving the instruction, the mobile station may use the second PN increment when scanning for pilot signals. However, the mobile station may also continue using the first PN increment. In particular, the mobile station may use the first PN increment as a "primary" PN increment for scanning and may use the second PN increment as a "second" PN increment for scanning. Thus, taking the first PN increment as "primary," the mobile station may conduct a first scan for pilot signals using the first PN increment, as indicated by block 108.

The mobile station may conduct the first scan by scanning for PN offsets that are integral multiples of a specified number of chips, wherein the specified number is based on the first PN increment. For example, IS-95 CDMA specifications define the minimal PN increment as being 64 chips. Thus, if the first group of sectors uses a PN increment of "3," then each PN offset in the first group is an integral multiple of 192 (3×64) chips. In that case, the mobile station may scan for successive integral multiples of 192 chips, as illustrated in FIG. 4. Thus, in the first scan, the mobile station would scan for target PN offsets of 192 chips, 384 chips, 576 chips, etc.

To scan for each target PN offset, the mobile station may use a search window that encompasses a range of PN offsets that includes the target PN offset. This is because the actual PN offset received by the mobile station may differ from the target PN due to transmission delays, reflections, etc. Each search window could be, for example, 20 chips wide. Thus, in the first scan, the mobile station may use search windows $F_1$, $F_2$, and $F_3$ to search for the target PN offset of 192 chips, 384 chips, and 576 chips, respectively.

The mobile station adds any acceptable pilot signals found in the first scan to its remaining set, as indicated by block 110. The mobile station may consider a pilot signal to be "acceptable" if its signal strength is above a preset value. In this way, the mobile station may populate its remaining set with zero or more sectors in the first group of sectors. Whether the mobile station then uses the second PN increment for scanning may depend on whether the remaining set populated by the first scan is large enough, as indicated by block 112. In particular, if the remaining set is deemed large enough, then scanning is complete, as indicated by block 114. However, if the remaining set is not large enough, then the mobile station conducts a second scan for pilot signals using the second PN increment, as indicated by block 116.

To determine whether the remaining set is large enough for scanning to be complete, the mobile station may compare the number of sectors in the remaining set to either a minimum number or a maximum number. Thus, in one approach, scanning may be considered complete when the remaining set contains at least a minimum number of sectors. In another approach, the mobile station may conduct the second scan whenever its remaining set contains less than the maximum number of sectors. Still other approaches could be used to determine whether the mobile station should conduct the second scan.

The mobile station may conduct the second scan in a manner similar to the first scan but using the second PN increment. For example, if the second PN increment is "4," the second scan may scan for target PN offsets of 256 chips, 512 chips, etc., as indicated by search windows $S_1$ and $S_2$ shown in FIG. 4. The mobile station then adds any acceptable pilot signals found in the second scan to its remaining set, as indicated by block 118. In this way, the mobile station may add zero or more sectors in the second group to its remaining set. The second group sectors in the remaining set may then be used for handoffs if the mobile station moves out of the wireless coverage area provided by the first group of sectors.

For example, in the configuration illustrated in FIG. 1, mobile station 40 might add sectors 30a, 30c, 34a, and 34c in second group 12 to its remaining set (to the extent that these sectors were not already identified in a neighbor list) as a result of the second scan. One or more of these second group sectors may subsequently be used for a handoff so as to maintain a call as mobile station 40 moves from the area covered by first group 10 to the area covered by second group 12. For example, after adding sector 30a to its remaining set, mobile station 40 may continue monitoring its pilot signal strength. If the pilot signal strength for sector 30a increases above a threshold value, mobile station 40 may send a PSMM that reports the pilot signal strength of sector 30a. If mobile station 40 continues moving toward sector 30a, then mobile station 40 may receive a Handoff Direction Message (HDM) that directs a handoff to sector 30a.

Thus, having a mobile station scan for pilot signals with PN offsets corresponding to the second PN increment while the mobile station is still being served by one or more sectors that use the first PN increment may beneficially result in the mobile station being more likely to maintain a call when the mobile station moves into an area covered by sectors that use the second PN increment.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method comprising:
serving, by a spread spectrum communication system comprising a first group of sectors and a second group of sectors that borders said first group of sectors along a boundary, a mobile station via a boundary sector in said first group, wherein said boundary sector is adjacent said boundary, wherein sectors in said first group transmit pilot signals having pseudonoise (PN) offsets corresponding to a first PN increment that defines a first number of chips between successive PN offsets and sectors in said second group transmit pilot signals having PN offsets corresponding to a second PN increment that defines a second number of chips between successive PN offsets, wherein said first number is different than said second number, wherein said PN offsets corresponding to said first PN increment have integral multiples of said first number of chips and said PN offsets corresponding to said second PN increment have integral multiples of said second number of chips, and wherein said mobile station maintains an active set, a neighbor set, a candidate set, and a remaining set; and
instructing said mobile station via said boundary sector to use said second PN increment when scanning for pilot signals to add to said remaining set, such that said mobile station scans for pilot signals using (i) a first search window that encompasses a first range of PN offsets, wherein said first range of PN offsets includes a first PN offset having a first integral multiple of said second number of chips, and (ii) a second search window that encompasses a second range of PN offsets, wherein said second range of PN offsets includes a second PN offset having a second integral multiple of said second number of chips.

2. The method of claim 1, further comprising:
said mobile station scanning for pilot signals to add to said remaining set using said first PN increment and thereafter scanning for pilot signals to add to said remaining set using said second PN increment.

3. The method of claim 2, wherein said mobile station scanning for pilot signals to add to said remaining set using said first PN increment and thereafter scanning for pilot signals to add to said remaining set using said second PN increment comprises:
said mobile station conducting a first scan using said first PN increment;
said mobile station adding any acceptable pilot signals found in said first scan to said remaining set;
said mobile station determining that said remaining set populated by said first scan is insufficient; and
in response to determining that said remaining set populated by said first scan is insufficient, said mobile station conducting a second scan using said second PN increment.

4. The method of claim 1, wherein instructing said mobile station via said sector to use said second PN increment when scanning for pilot signals to add to said remaining set comprises:
sending a neighbor list to said mobile station via said sector, wherein said neighbor list identifies at least one PN offset corresponding to said second PN increment.

5. A method comprising:
while serving a mobile station via a sector in a first group of sectors controlled by a first serving system, said first serving system determining that said mobile station is likely to be in a communication range of at least one sector in a second group of sectors bordering said first group of sectors along a boundary and controlled by a second serving system, wherein sectors in said first group transmit pilot signals having pseudonoise (PN) offsets corresponding to a first PN increment that defines a first number of chips between successive PN offsets and sectors in said second group transmit pilot signals having PN offsets corresponding to a second PN increment that defines a second number of chips between successive PN offsets, wherein said first number is different than said second number, wherein said PN offsets corresponding to said first PN increment have integral multiples of said first number of chips and said PN offsets corresponding to said second PN increment have integral multiples of said second number of chips, and wherein said mobile station maintains an active set, a neighbor set, a candidate set, and a remaining set; and
said first serving system responsively instructing said mobile station to use said second PN increment when scanning for pilot signals to add to said remaining set, such that said mobile station scans for pilot signals using (i) a first search window that encompasses a first range of PN offsets, wherein said first range of PN offsets includes a first PN offset having a first integral multiple of said second number of chips, and (ii) a second search window that encompasses a second range of PN offsets, wherein said second range of PN offsets includes a second PN offset having a second integral multiple of said second number of chips.

6. The method of claim 5, wherein said first serving system determining that said mobile station is likely to be in a communication range of at least one sector in said second group comprises:
said first serving system determining that said mobile station is communicating with a boundary sector in said first group, wherein said boundary sector is adjacent said boundary.

7. The method of claim 6, wherein said mobile station is communicating with said boundary sector via a forward link and a reverse link, and wherein said first serving system determining that said mobile station is likely to be in a communication range of at least one sector in said second group further comprises:
detecting a signal degradation in said forward link or said reverse link.

8. The method of claim 5, wherein said first serving system determining that said mobile station is likely to be in a communication range of at least one sector in said second group comprises:
analyzing signal strengths measured by said mobile station of pilot signals from sectors in said first group.

9. The method of claim 8, wherein said first serving system determining that said mobile station is likely to be in a communication range of at least one sector in said second group further comprises:
determining that at least one of said signal strengths is below a predetermined level.

10. The method of claim 5, wherein instructing said mobile station to use said second PN increment when scanning for pilot signals to add to said remaining set comprises:
sending a neighbor list to said mobile station, wherein said neighbor list identifies at least one PN offset corresponding to said second PN increment.

11. The method of claim 5, wherein instructing said mobile station to use said second PN increment when scanning for pilot signals to add to said remaining set comprises:

instructing said mobile station to use said second PN increment after using said first PN increment when scanning for pilot signals to add to said remaining set.

12. A method for a mobile station, wherein said mobile station maintains an active set, a neighbor set, a candidate set, and a remaining set, said method comprising:

receiving, by said mobile station, an instruction via a sector serving said mobile station, wherein said sector is in a first group of sectors that have pseudonoise (PN) offsets corresponding to a first PN increment, and wherein said mobile station is within a communication range of a second group of sectors that have PN offsets corresponding to a second PN increment, wherein said first PN increment defines a first number of chips between successive PN offsets and said second PN increment defines a second number of chips between successive PN offsets, wherein said first number is different than said second number, and wherein said PN offsets corresponding to said first PN increment have integral multiples of said first number of chips and said PN offsets corresponding to said second PN increment have integral multiples of said second number of chips; and in response to said instruction, scanning, by said mobile station, for pilot signals to add to said remaining set using said first PN increment and said second PN increment, wherein scanning for pilot signals to add to said remaining set using said PN increment comprises scanning for pilot signals using (i) a first search window that encompasses a first range of PN offsets, wherein said first range of PN offsets includes a first PN offset having a first integral multiple of said second number of chips, and (ii) a second search window that encompasses a second range of PN offsets, wherein said second range of PN offsets includes a second PN offset having a second integral multiple of said second number of chips.

13. The method of claim 12, wherein scanning, by said mobile station, for pilot signals to add to said remaining set using said first PN increment and said second PN increment comprises:

scanning, by said mobile station, for pilot signals to add to said remaining set using said first PN increment and thereafter scanning for pilot signals to add to said remaining set using said second PN increment.

14. The method of claim 13, wherein scanning, by said mobile station, for pilot signals to add to said remaining set using said first PN increment and thereafter scanning for pilot signals to add to said remaining set using said second PN increment comprises:

conducting, by said mobile station, a first scan using said first PN increment;

adding, by said mobile station, any acceptable pilot signals found in said first scan to said remaining set;

determining, by said mobile station, that said remaining set populated by said first scan is insufficient; and in response to determining that said remaining set populated by said first scan is insufficient, conducting, by said mobile station, a second scan using said second PN increment.

15. The method of claim 14, wherein determining, by said mobile station, that said remaining set populated by said first scan is insufficient comprises:

determining, by said mobile station, that said remaining set populated by said first scan contains less than a predetermined number of sectors.

16. The method of claim 12, wherein said instruction comprises a neighbor list that identifies at least one PN offset corresponding to said second PN increment.

* * * * *